No. 710,073. Patented Sept. 30, 1902.
P. W. PRATT & R. E. FOSTER.
ELASTIC TIP.
(Application filed Dec. 28, 1901.)
(No Model.)
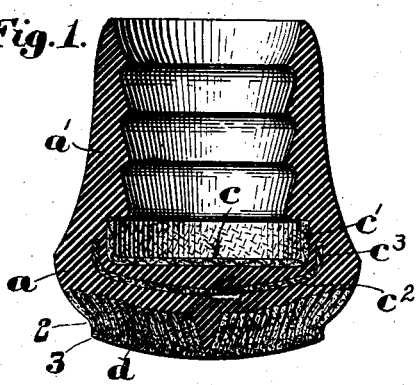
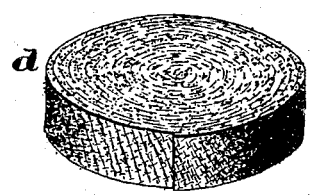
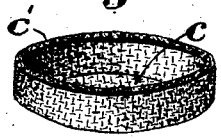
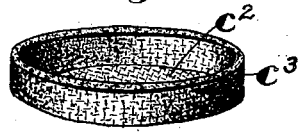
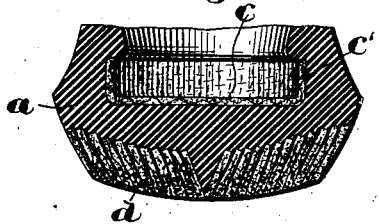
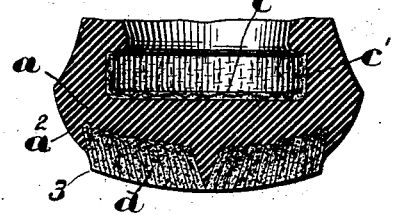
Witnesses:
Walter E. Lombard
E. Batchelder
Inventors:
P. W. Pratt
R. E. Foster
by Wright, Brown & Quinby
Attys.
THE NORRIS PETERS CO., PHOTO-LITHO., WASHINGTON, D. C.

UNITED STATES PATENT OFFICE.

PHILIP W. PRATT, OF BOSTON, AND ROLON E. FOSTER, OF REVERE, MASSACHUSETTS, ASSIGNORS TO DANIEL S. PRATT, OF BROOKLINE, MASSACHUSETTS.

ELASTIC TIP.

SPECIFICATION forming part of Letters Patent No. 710,073, dated September 30, 1902.

Application filed December 28, 1901. Serial No. 87,591. (No model.)

*To all whom it may concern:*

Be it known that we, PHILIP W. PRATT, of Boston, and ROLON E. FOSTER, of Revere, in the county of Suffolk and State of Massachusetts, have invented certain new and useful Improvements in Elastic Tips, of which the following is a specification.

This invention relates to elastic tips for crutches, canes, chair-legs, &c.; and it has for its object, first, to produce a strong and durable tip having means for increasing the frictional and wear-resisting qualities of the tip.

The invention consists in the improvements which we will now proceed to describe and claim.

Of the accompanying drawings, forming a part of this specification, Figure 1 represents a sectional view of a tip embodying our invention. Fig. 2 represents a perspective view of the frictional tread-piece before the same is applied to the tip. Figs. 3 and 4 represent perspective views of the reinforcing layers shown in Fig. 1. Fig. 5 represents a side view of a portion of the strip from which the frictional tread-piece shown in Fig. 2 is made. Fig. 6 represents a view similar to Fig. 1, showing a slight variation in form hereinafter alluded to. Fig. 7 represents another variation or modification.

The same reference characters indicate the same parts in all the figures.

In the drawings, $a$ represents a tip the body portion of which is composed of elastic vulcanized rubber or rubber compound and is provided with suitable means whereby it may be attached to a crutch-stick or other article, said means ordinarily comprising a flange $a'$, formed integral with the head $a$, and therefore of the same material, said flange forming a wall or socket, of which the tip $a$ forms the closed end or bottom.

$c$ represents a reinforcing layer, which is substantially inextensible and is composed of frictioned stock—that is to say, suitably strong cloth, such as duck or canvas, frictioned or treated with unvulcanized rubber in such manner that when it is placed in contact with the unvulcanized rubber body of the tip $a$ and the whole is subjected to the process of vulcanization the layer $c$ will be firmly united to the rubber body of the tip, the rubber constituents of both parts being at the same time vulcanized.

The reinforcing layer $c$ is preferably provided with a rim or flange $c'$, which forms a part of the socket-wall, as shown in Fig. 1.

The reinforcing layer $c$ is interposed between the outer tread-surface of the tip $a$ and the socket-cavity, so that it assists the rubber body in supporting the pressure of the crutch-stick or other article to which the tip is applied and prevents said stick from being pushed through the rubber body, particularly when the latter is made relatively thin, as in the construction here shown, where the outer or tread portion of the tip is made separately and vulcanized to the rubber body, as hereinafter described, so that the rubber body is relatively thin.

We have here shown a second reinforcing layer $c^2$ of the same material as the layer $c$ and provided with a flange $c^3$. The layer $c^2$ is preferably separated from the layer $c$ by a portion of the elastic rubber of the body of the tip, as shown in Fig. 1.

$d$ represents a wear-resisting frictional tread-piece which covers the outer surface of the rubber body of the tip and is composed of a strip $d'$ of heavily-frictioned stock, such as duck or canvas wound into a coil the convolutions of which are in contact with each other and are tapered or dished when incorporated into the tip, as shown clearly in Figs. 1 and 6, so that they form practically a frusto-conical disk or tread-face. The dishing or tapering of the convolutions may be produced by means of suitable dies formed to confine the lower end of the disk and expand or enlarge the upper end, suitable pressure being applied to the upper end of the tread-piece to spread the upper portions of the convolutions. After the tread-piece is thus formed the unvulcanized rubber of the tip is applied to it before the vulcanization of any of the parts, the convolutions of the strip being firmly united to each other and to the rubber body of the tip by the process of vulcanization. The conical or dished form of the convolutions of the friction-tread gives their upper portions an extended bearing on the rubber body of the tip, so that they are firmly united to the rubber body by the vulcanizing process. The said conical form also prevents any tendency of the convolutions to separate from each other under the pressure to which they are subjected, it being obvious that the pressure of the friction-tread against a floor or other surface will tend to press the lower edges of the convolutions inwardly or toward the center of the tread-piece instead of having a tendency to separate said convolutions and press them outwardly, especially at the outer portion of the tread, which tendency might exist if the convolutions were vertically arranged.

The mold in which the tread-piece is pressed is formed to shape the margin of the tread-piece into the form shown in Fig. 1, said margin having a reëntrant angle 2 and a salient angle or shoulder 3. The tread-face of the tread-piece is thus given a well-defined form and is caused to project below the enlarged upper portion of the tread-piece, so that the margin of said upper portion is not liable to be subjected to wear, as would be the case if the margin had the straight tapering form shown in Fig. 6.

The strip $d'$, from which the frictional tread-piece $d$ is made, preferably has its threads arranged diagonally, so that they extend toward the tread-surface of the tread-piece and cannot ravel out, so as to expose long stretches of thread on said tread-piece. This diagonal arrangement of the threads is not claimed in this application, it being set forth and claimed in an application filed October 9, 1901, Serial No. 78,089, by Rolon E. Foster, one of the present applicants, said application showing and describing an elastic cushion formed for application to a boot or shoe heel and having a frictional plug composed of a strip of frictioned textile fabric wound into a coil and inserted in the elastic body of the cushion, the lower end of the plug being surrounded by and substantially flush with the tread-surface of the cushion.

We do not limit ourselves to a tread-piece made of woven fabric, as described. The tread-piece may be made by winding a strip of felt or other textile fabric or material suitably frictioned into a coil or by using alternating layers of woven fabric and felt, both frictioned or suitably impregnated with unvulcanized rubber.

The upper end of the tread-piece may be surrounded by a wall of rubber integral with the body $a$, said wall terminating above the tread-face of the tread-piece, as shown in Fig. 7, so that the shoulder 3 projects below rubber portion and prevents the rubber portion from bearing on the floor or pavement.

The described improvement may be embodied in an elastic tip having an annular tread-surface like that shown in Fig. 6 of United States Patent No. 679,468.

We claim—

1. An elastic tip forming the bottom of a socket and having an annular flange forming the wall of the socket, the body portions of said tip and flange being of elastic vulcanized rubber, and an inextensible reinforcing layer of frictioned stock vulcanized to said tip between its tread-surface and the socket-cavity.

2. An elastic tip forming the bottom of a socket and having an annular flange forming the wall of the socket, the body portions of said tip and flange being of elastic vulcanized rubber, and an inextensible reinforcing layer of frictioned stock vulcanized to said tip between its tread-surface and the socket-cavity, said layer having a flange surrounding the socket-cavity.

3. An elastic tip having suitable means for attachment to a chair, crutch or cane, the body portion of said tip being of elastic vulcanized rubber, and a frictional tread composed of a strip of frictioned textile material formed into dished or tapered convolutions which are vulcanized to each other and to the elastic body of the tip.

4. An elastic tip forming the bottom of a socket and having a flange forming the wall of the socket, the body portion and flange being of elastic vulcanized rubber, a relatively inelastic tread-piece attached to the lower side of the elastic body of the tip, and an inextensible reinforcing layer of frictioned stock vulcanized to the tip between the tread-piece and the socket-cavity, said reinforcing layer having a flange extending upwardly and surrounding the socket-cavity.

In testimony whereof we have affixed our signatures in presence of two witnesses.

PHILIP W. PRATT.
ROLON E. FOSTER.

Witnesses:
C. F. BROWN,
E. BATCHELDER.